(12) United States Patent
Gabhart

(10) Patent No.: US 10,479,259 B1
(45) Date of Patent: Nov. 19, 2019

(54) COMPOSITE DESIGN BUNK RAIL SYSTEMS

(71) Applicant: Warren Timothy Gabhart, Louisville, KY (US)

(72) Inventor: Warren Timothy Gabhart, Louisville, KY (US)

( * ) Notice: Subject to any disclaimer, the term of this patent is extended or adjusted under 35 U.S.C. 154(b) by 0 days.

(21) Appl. No.: 16/501,620

(22) Filed: May 10, 2019

Related U.S. Application Data

(60) Provisional application No. 62/762,601, filed on May 11, 2018.

(51) Int. Cl.
*B60P 3/10* (2006.01)

(52) U.S. Cl.
CPC ........... *B60P 3/1066* (2013.01); *B60P 3/1075* (2013.01)

(58) Field of Classification Search
CPC ...... B60P 3/1033; B60P 3/1066; B60P 3/1075
See application file for complete search history.

(56) References Cited

U.S. PATENT DOCUMENTS

| 4,681,334 | A   | * | 7/1987  | O'Brien, Jr. | B60P 3/1033 280/414.1 |
| 5,002,299 | A   | * | 3/1991  | Firehammer   | B60P 3/1066 280/414.1 |
| 6,830,410 | B2  | * | 12/2004 | Davidson     | B63C 3/06 280/414.1 |
| 9,446,824 | B2  | * | 9/2016  | Swart        | B60P 3/1066 |
| 9,771,013 | B1  | * | 9/2017  | Delanghe     | B60P 3/1066 |
| 2006/0181056 | A1 | * | 8/2006 | Weekes       | B60P 3/1033 280/414.1 |
| 2015/0158566 | A1 | * | 6/2015 | Doig         | B63C 3/06 405/7 |

* cited by examiner

*Primary Examiner* — Kevin Hurley
(74) *Attorney, Agent, or Firm* — George H. Morgan

(57) ABSTRACT

A composite design bunk rail system comprises low coefficient of friction adjustable slides with a shock absorbing base, simplifying and precluding damages from loading and handling vehicles, a supporting structure, and adjustable support frames.

3 Claims, 10 Drawing Sheets

© 2019 WARREN TIMOTHY GABHART

© 2019 WARREN TIMOTHY GABHART

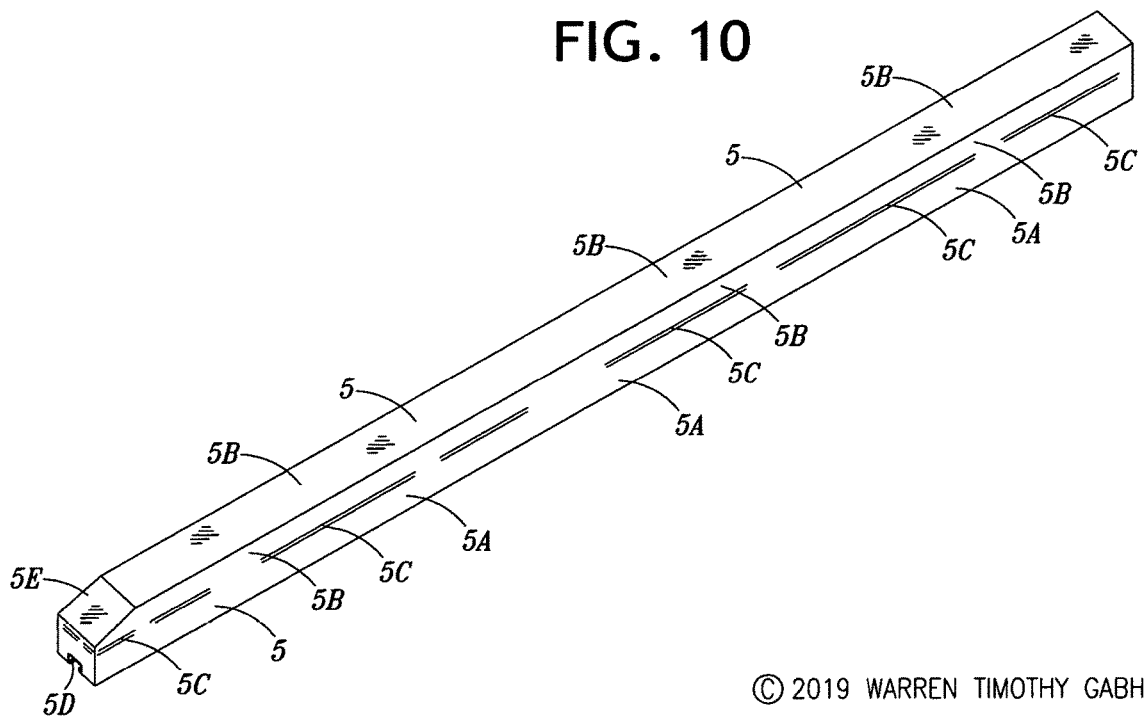

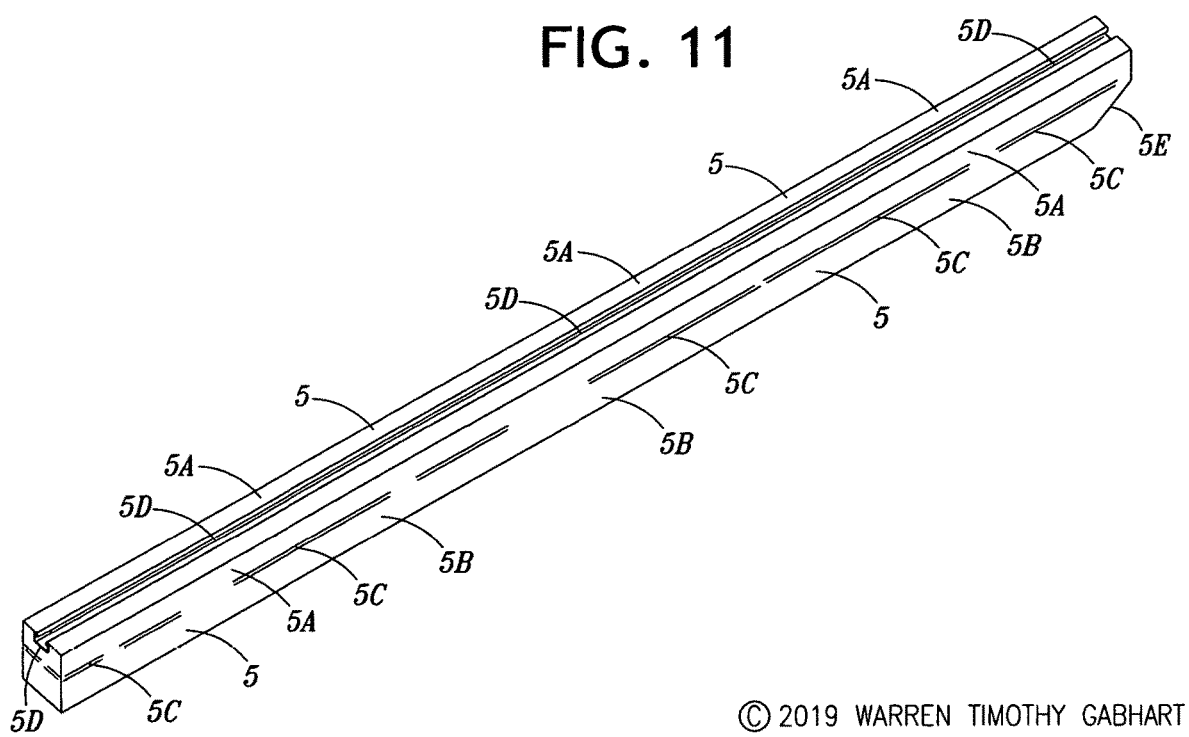

COMPOSITE DESIGN BUNK RAIL SYSTEMS

CROSS REFERENCES TO RELATED APPLICATIONS

Provisional Application for Patent No. 62/762,601 filed May 11, 2018 with the same title which is incorporated by reference. Applicant claims priority on material disclosed pursuant to 35 U.S.C. Par 119(e)(i).

A portion of the disclosure for this patent document contains material which is subject to copyright protection. The copyright owner has no objection to the facsimile reproduction of by anyone of the patent document or the patent disclosure, as it appears in the Patent and Trademark Office patent file or records, but otherwise reserves all copyrights whatsoever.

STATEMENTS REGARDING FEDERALLY SPONSORED RESEARCH AND DEVELOPMENT

Not applicable

THE NAMES OF THE PARTIES TO A JOINT RESEARCH AGREEMENT

Not applicable

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable

BACKGROUND OF THE INVENTION

(1) Field of the Invention

This invention relates to a composite design bunk rail system such as, but not restricted to, for use in supporting boats, marine use or haulage trailers for personal water devices, All Terrain Vehicles (ATVs), snowmobiles, or for boat lifts.

2. Background Information

Current practice in trailers in supporting many types of vehicles, such as, to name a few, boats, snowmobiles, and ATVs, or for boat lifts, is to use wood with a carpet covering. For more expensive products, there are rigid plastic liners.

However, marina operators have told this applicant that the wood and carpet coverings do not work very well or for very long, and boat owners get very upset when their expensive toys are scratched in transport or handling.

Entrapment of dirt, sand, grit, and other contaminants in wood and carpet constructions is an abrasive problem.

Rotting of wood is also a problem.

Also, mechanical fasteners in wood and carpet constructions such as staples, brads, nails and screws can mar vehicle surfaces.

The primary advantage of plastic instead of wood with carpet coverings seems to be that when a trailer is in the water, wet plastic provides a slippery surface for easier removal of a boat from the trailer in the water.

As will be seen from the subsequent description of the preferred embodiments of the present invention, this present invention overcomes existing deficiencies in the prior art.

BRIEF SUMMARY OF THE INVENTION

In the preferred embodiment of the present invention a composite design bunk rail system comprises low coefficient of friction surfaces and adjustable slides simplifying the loading and handling of vehicles, precluding damages from loading, unloading, and handling vehicles such as, but not restricted to, boats. It further comprises a supporting structure, boat slides, frame supports, and adjustable support frames.

The adjustable support slide low coefficient of friction surfaces are bonded to shock absorbing cushions such as, but not restricted to, rubber with a 40 to 70 Shore Durometer hardness rating which serve as shock absorbers.

BRIEF DESCRIPTION OF THE SEVERAL VIEWS OF THE DRAWINGS

FIGS. 6 through 12 illustrate details of the FIGS. 1 through 4.

DETAILED DESCRIPTION OF THE INVENTION

Figure 1:
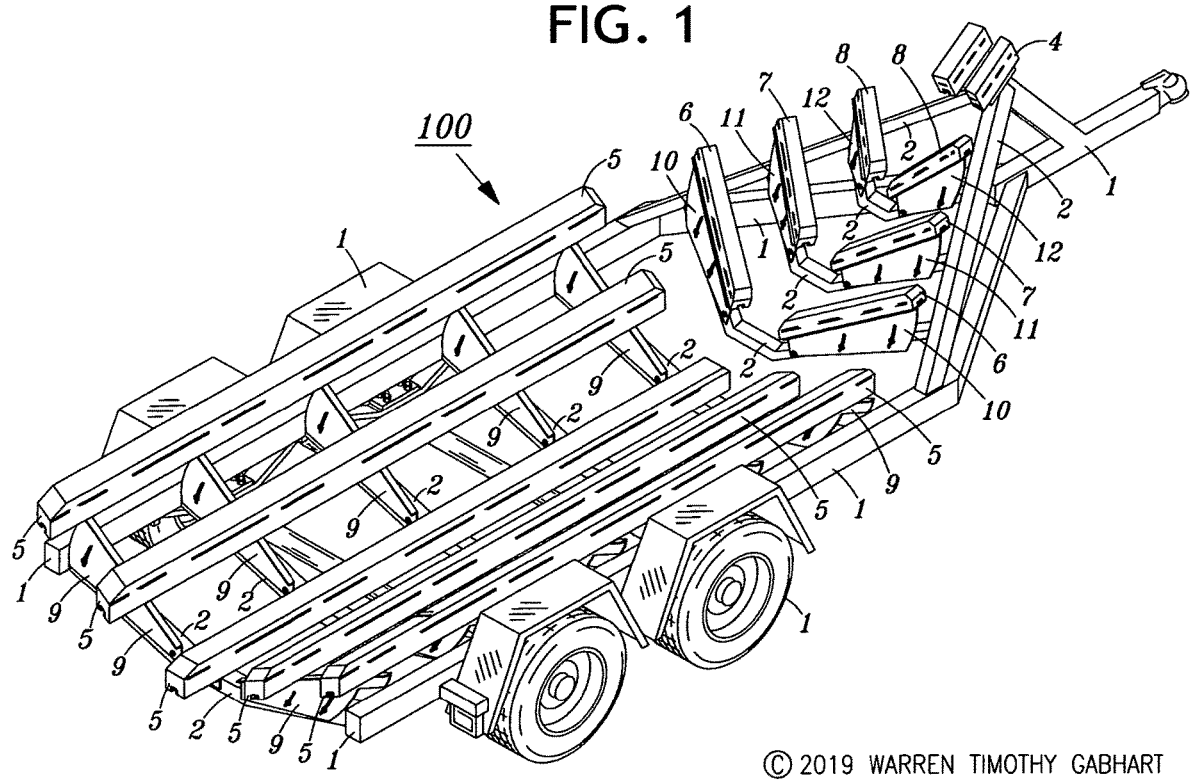
FIGS. 1 through 4 illustrate preferred embodiments of the present invention.
Figure 2:
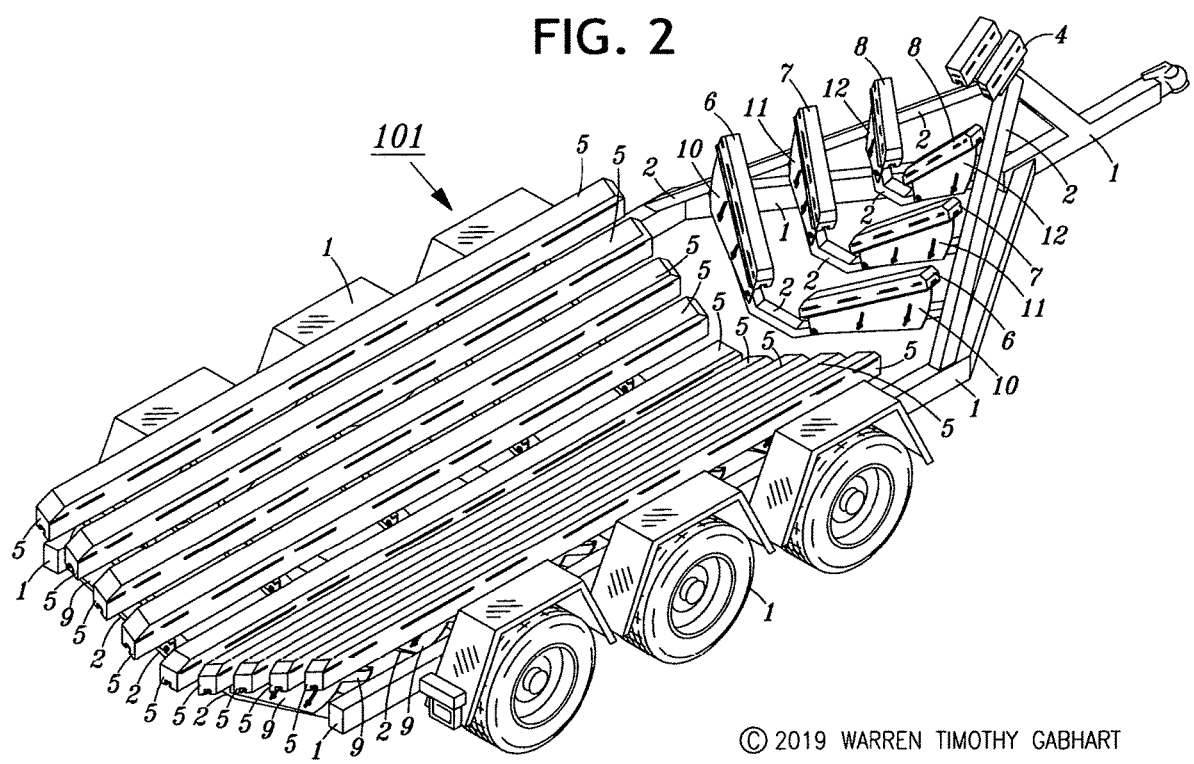
Figure 3:
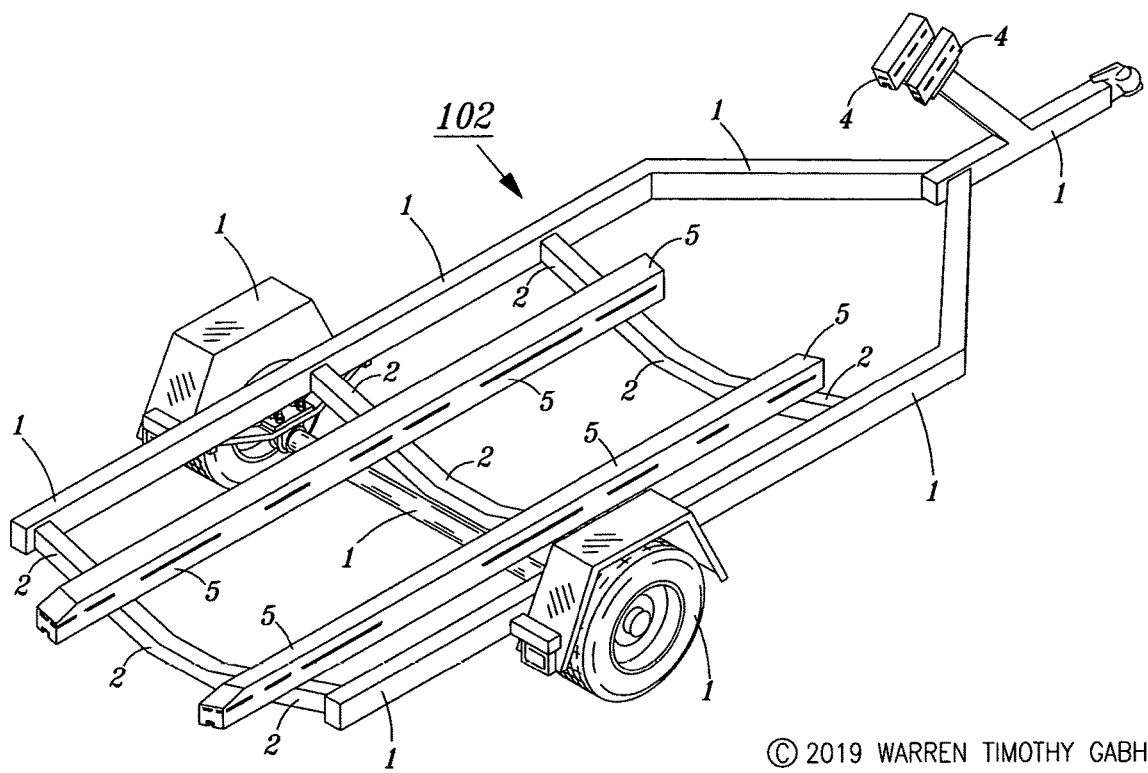
Figure 4:
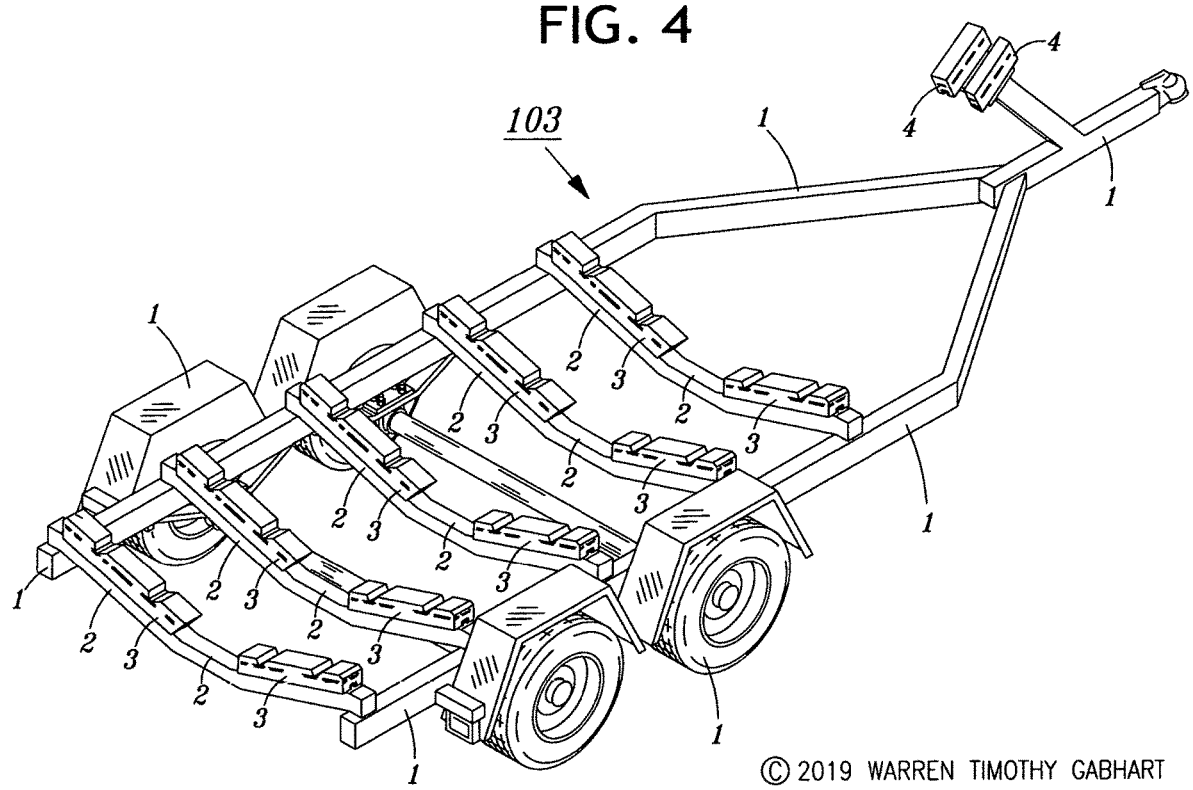
Figure 5:
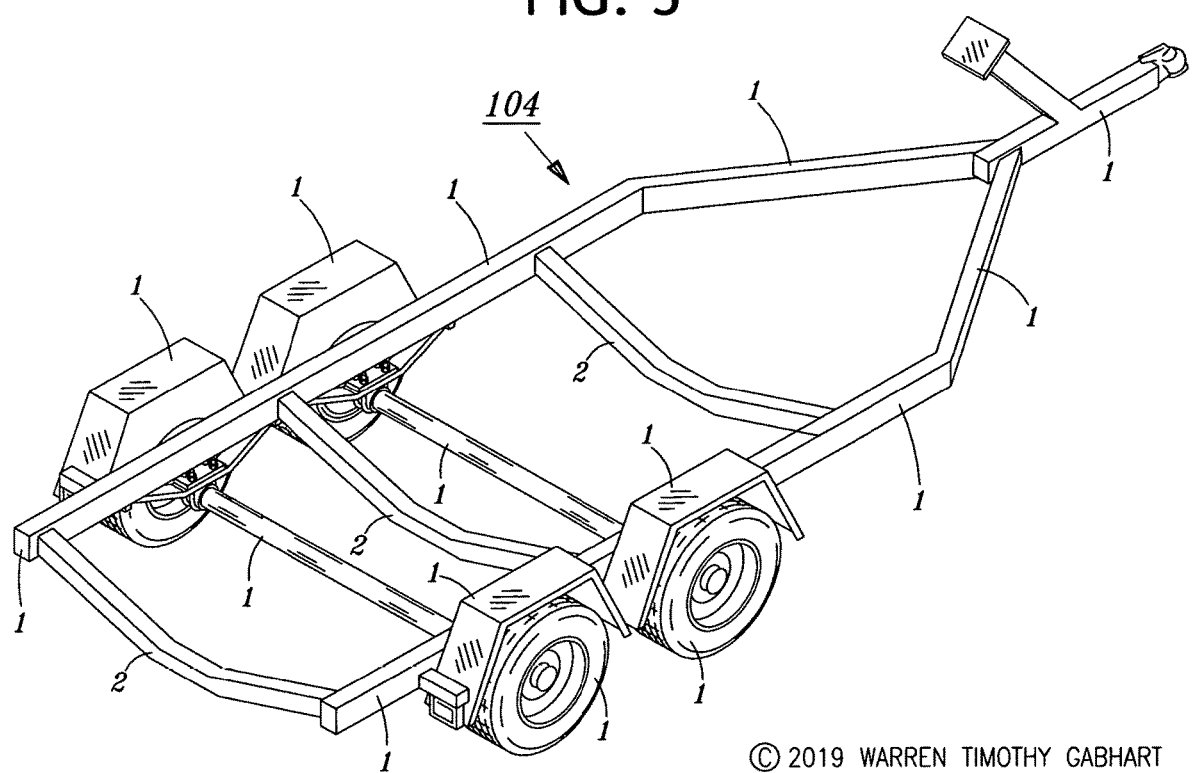
FIG. 5 illustrates a boat trailer.
Figure 6:
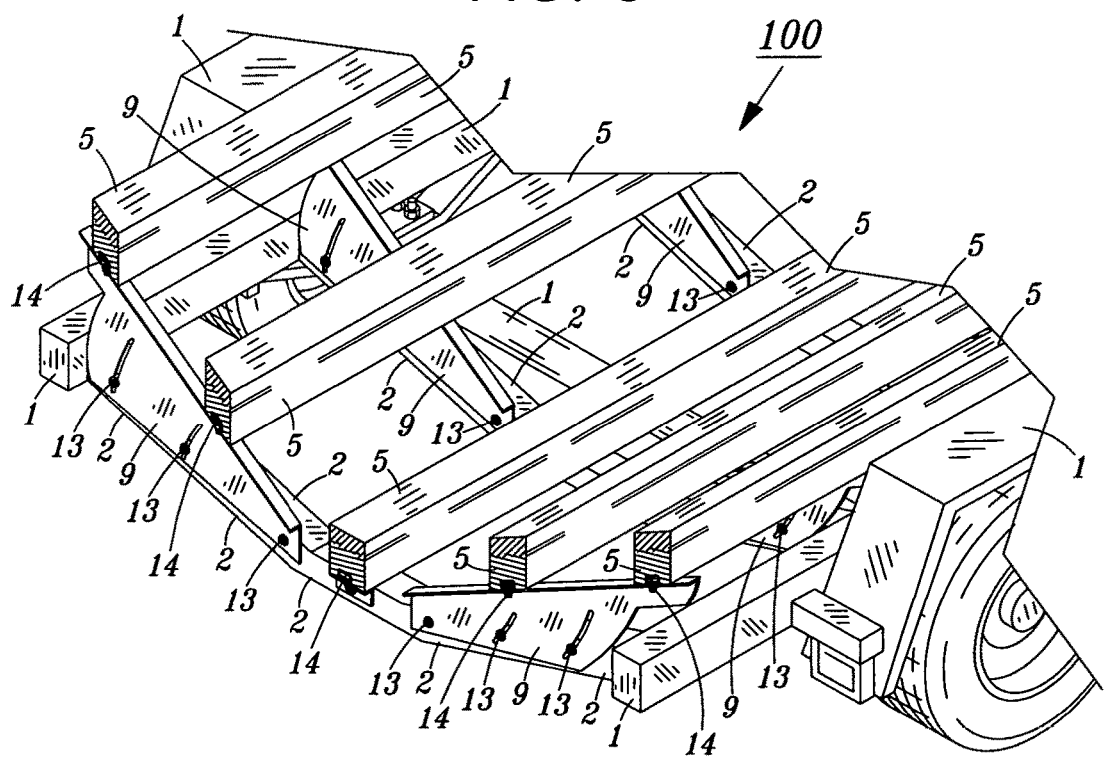
Figure 8:
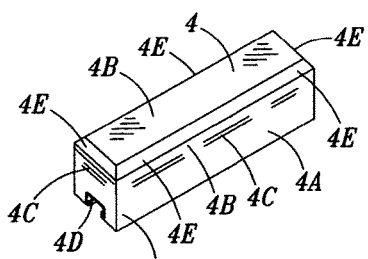
Figure 9:
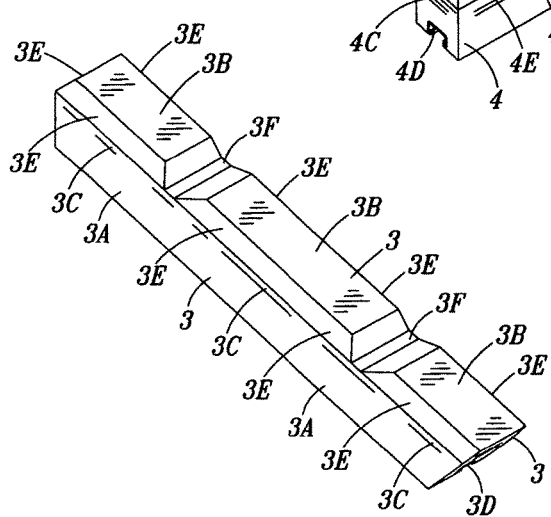

Referring to FIGS. 1 through 12, the preferred embodiment of the present invention, a composite design bunk rail system 100 comprising a supporting structure 1 such as, but not restricted to an at least one axle trailer with transverse frame supports 2; vehicle slides 3 with integral C shaped channel support structures 3D, boat chine clearances 3F, bottom slide supports 3A, top side vehicle contacts 3B, and blended areas 3C each of which are a blend of a given bottom slide support 3A and an adjacent top side vehicle contact 3B; chamfered slides 4 with chamfers 4E, lower slide supports 4A, upper boat vehicle contacts 4B, blended areas 4C each of which are a blend of a given lower side support 4A and an adjacent upper vehicle contact 4B, and an integral C shaped channel support structure 4D; self supporting slides 5 with self supporting vehicle slide bottom supports 5A, self supporting vehicle slide upper vehicle contacts 5B, blended areas 5C each of which are a blend of a given support 5A and a contact 5B, and an integral C shaped channel support structure 5D, and chamfers 5E as required for a specific application; and slides 6, 7, and 8. The slides 6, 7, and 8 are constructed in the same manner as is the slide 4 detailed in FIG. 7.

The vehicle contacts 3B, 4B, and 5B, in the preferred embodiment of the present invention, comprise an ultra high molecular weight polyethylene plastic (UHMWPE) with a low coefficient of friction, The contacts 3B, 4B, and 5B have a low coefficient of friction, i.e. are relatively slick, especially when wet and facilitate sliding a vehicle into place in a loading or unloading process, serving as a wear surfaces, which are bonded to the supports 3A, 4A, and 5A which serve as a shock absorbing base, such as, but not restricted to rubber with a 40 to 70 Shore Durometer hardness rating, in the preferred embodiment of the present invention.

Figure 12:
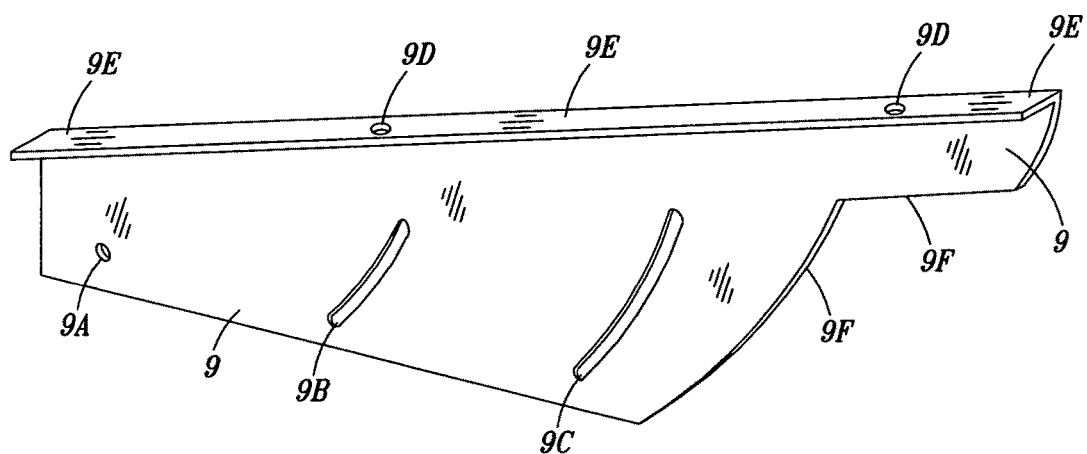

Referring to FIG. 12, the adjustable support frames 9, as typical of adjustable support frames 10, 11, and 12, (Ref. FIG. 1) comprise an aperture 9A, radial slots 9B and 9C, mounting apertures 9D, and a mounting surface 9E.

Bolt assemblies 13 through the aperture 9A, radial slots 9B and 9C permit attachment of the adjustable support frame 9 to the frame support 2, as well as rotation of the adjustable support frame 9 to conform to a supported vehicle such, but not restricted to, a boat (not shown) which may have any of a variety of shapes. The adjustable support frames 10, 11, and 12 are similarly attached and function as the adjustable support frame 9, conforming to a variety of vehicle shapes, or even directly bonding the boat slides 3, 4, and 5 to a metal piece for through bolting the slides 3, 4, and 5

Figure 7:
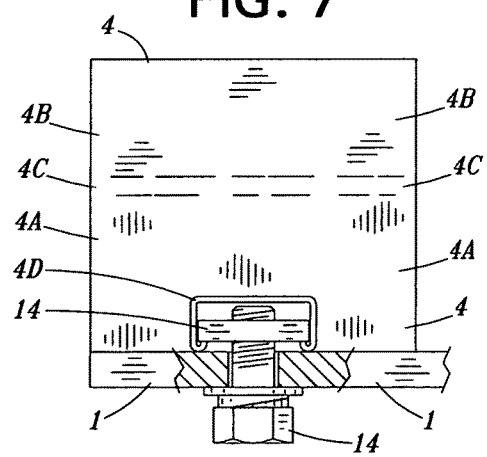

Referring to FIG. 7, the boat slide 4 is attached to the supporting structure 1 by means of a fastener assembly 14 connecting the integral C shaped channel support 4D of the boat slide 4 to the supporting structure 1 through a supporting structure aperture 1A.

The fastener assembly 14 comprises a mounting channel nut 14A, a bolt 14B, a flat washer 14C, and a lock washer 14D. As obvious to those skilled in the art of fasteners, there are many ways to serve the same function as the fastener assembly 14, such as T bolts or through bolt assemblies, or even directly bonding the slides 3, 4, and 5 to a metal base (not shown) with a through bolt through the slides 3, 4, and 5, and the metal base, attaching the slides, 3, 4, and 5 to the supporting structure 1.

The boat slides 3, 4, 5, 6, 7, and 8 are similarly attached.

Advantages and objectives of the preferred embodiments of the present invention, a composite design bunk rail system 100:

has slides flexibility in case of bumping into an oddly molded hull shape or other rigid shape during a loading or unloading process to provide protection for the most valuable part of a boat, the hull.

allows for additional load cushion, support, and vibration dampening that adds to the suspension characteristics of a trailer design.

becomes a structural member of a support system because of the composite design.

can be a permanent long lasting part of the supporting structure.

retrofits and easily mounts to many of the brackets currently used for the existing lumber/carpet components currently used.

is impervious to weather, salt and other ambient environments.

replaces metal springs or other mechanical suspension devices in certain cases on a trailer.

allows a more complete engineering and design with this invention due to more precise and predictable physical characteristics such as cushion and other loading parameters as needed versus the inconsistencies and variations of lumber.

better protects large vehicles through the vibration dampening of rubber, suspending an entire unit above a mechanical hauling vehicle.

better protects payload from extreme impact encountered on roads during transport such as potholes, speed bumps, and rail crossings plus some protection against driver area.

the shock absorbing bases conform to a boat hull, providing a better fit.

minimizes backing a boat trailer and towing vehicle into water for floating a boat onto or off a trailer.

eases winching of a load off a trailer or even allows driving a boat onto the system 100.

creates a safer bunk rail system with no nails, staples or mechanical fasteners exposed, nothing embedded in a carpet to trap material or to come loose and permit damage to a transported vehicle.

eases pushing any load into or on or off the system 100.

has no lumber to rot or break while standing upon it, trying to push or pull a transported vehicle on or off a transporting vehicle, thus providing some safety for an operator.

Although the description above contains many specificites, these should not be construed as limiting the scope of the invention, but as merely providing illustrations of some of the preferred embodiments of the present invention.

For example, while a bolt assembly is given as example of affixing slides 3, 4, 5 to supports 2, the slides could also be bonded to the supports by a cold or hot bond or some other adhesive process.

It will be obvious to those skilled in the art that modifications may be made to the embodiments described above without departing from the scope of the present invention.

Thus the scope of the invention should be determined by the appended claims in the formal application and their legal equivalents, rather than by the examples given.

I claim:

1. A composite design bunk rail system comprising a supporting structure, vehicle slides, and adjustable support frames,
   wherein the vehicle slides are attached to the adjustable support frames,
   wherein the vehicle slides are a composite design with a low coefficient of friction sliding surface adhered to a shock absorbing base,
   wherein the shock absorbing base is a rubber with a 40 to 70 Shore durameter hardness rating, which serves as a vibration isolator,
   wherein each of the adjustable support frames comprises an aperture and radial slots and is bolted to the given frame support permitting rotation of the adjustable support frame with the vehicle slide to conform to a supported vehicle.

2. The composite design bunk rail system of claim 1 wherein the vehicle slides comprise integral U shaped supports.

3. The composite design bunk rail system of claim 1 wherein the supporting structure is a boat trailer.

* * * * *